(12) United States Patent
Otsuka et al.

(10) Patent No.: US 7,688,702 B2
(45) Date of Patent: Mar. 30, 2010

(54) OPTICAL DISC AND OPTICAL DISC DEVICE

(75) Inventors: Masato Otsuka, Tokyo (JP); Toshihiro Sugaya, Yokohama (JP)

(73) Assignees: Memory-Tech Corporation, Chikusei (JP); Kabushiki Kaisha Toshiba, Tokyo (JP)

(*) Notice: Subject to any disclaimer, the term of this patent is extended or adjusted under 35 U.S.C. 154(b) by 813 days.

(21) Appl. No.: 11/170,560

(22) Filed: Jun. 29, 2005

(65) Prior Publication Data

US 2006/0092820 A1    May 4, 2006

(30) Foreign Application Priority Data

Sep. 27, 2004    (JP) .............................. 2004-279847

(51) Int. Cl.
G11B 7/24 (2006.01)
(52) U.S. Cl. ........................................................ 369/270
(58) Field of Classification Search ............... 369/275.1, 369/286
See application file for complete search history.

(56) References Cited

U.S. PATENT DOCUMENTS

| | | | |
|---|---|---|---|
| 5,883,877 A | 3/1999 | Nishizawa | |
| 6,069,868 A | 5/2000 | Kashiwagi | |
| 6,469,965 B1* | 10/2002 | Horita | 369/53.2 |
| 6,597,643 B1 | 7/2003 | Mitchell et al. | |
| 6,928,651 B2* | 8/2005 | Kurokawa et al. | 720/718 |
| 6,982,127 B2* | 1/2006 | Kondo et al. | 428/836 |
| 2004/0233827 A1* | 11/2004 | Yi et al. | 369/121 |
| 2006/0120258 A1* | 6/2006 | Sugaya et al. | 369/275.1 |
| 2008/0267046 A1* | 10/2008 | Komma | 369/121 |

FOREIGN PATENT DOCUMENTS

| | | |
|---|---|---|
| EP | 0 520 619 A1 | 12/1992 |
| EP | 0 886 269 A2 | 12/1998 |
| JP | 08-0339574 A | 12/1996 |
| JP | 11-296861 A | 10/1999 |
| JP | 2001-176129 A | 6/2001 |
| JP | 2002-257134 A | 3/2004 |
| JP | 2004-071046 A | 3/2004 |
| TW | 407269 | 10/2000 |

OTHER PUBLICATIONS

Official action dated Jan. 6, 2009 in JP 2004-279847.
Decision of Final Rejection from related JP 2004-279847 with English language translation.

* cited by examiner

*Primary Examiner*—Mark Blouin
(74) *Attorney, Agent, or Firm*—Barnes & Thornburg LLP

(57) ABSTRACT

A single-sided dual-layer optical disc comprising an optically transparent layer; a first recording layer accessed by a first laser beam; an intermediate layer; and a second recording layer accessed by a second laser beam, wherein the optically transparent layer, the first recording layer, the intermediate layer, and the second recording layer are sequentially disposed in a laser beam incidence direction, wherein a thickness of the optically transparent layer, which is a distance from a light incident surface to the first recording layer, is 550 to 575 μm, wherein a thickness of the intermediate layer, which is a distance between the first and second recording layers, is 29 to 47 μm, and wherein a surface recording density of the second recording layer is at least 3 times that of the first recording layer.

1 Claim, 15 Drawing Sheets

OPTICAL DISC AND OPTICAL DISC DEVICE

CROSS-REFERENCE TO RELATED APPLICATIONS

The present application claims priority upon Japanese Patent Application No. 2004-279847 filed on Sep. 27, 2004, which is herein incorporated by reference.

BACKGROUND OF THE INVENTION

1. Field of the Invention

The present invention relates to an optical disc, such as a DVD, to be a medium for storing digitized video and audio works and the like, such as movies and music. In addition, the present invention also relates to an optical disc device which reads information recorded on an optical disc.

2. Description of the Related Art

=Overview of DVD Standard=

As is generally known, there is a DVD (digital versatile disc) as an optical disc for storing digital images. The DVD has been widely used all over the world mainly for storage and distribution of movie contents (publication of digital products). This DVD is a standard worked out by the DVD forum, which has been made public as a DVD standard (DVD Book) (see www.dvdforum.org) and also specified by International Standards and JIS. Here, a brief description will be given according to the International Standard of a 120-mm DVD-ROM, IS0/IEC16448, which is one of the DVD physical standards.

As to the 120-mm DVD-ROM, there are four types of discs in total, including a single-sided specification with a single recording layer, a single-sided specification with dual recording layers, a double-sided specification with a single recording layer, and a double-sided specification with dual recording layers. For storage and distribution of contents such as movies, the two types of the single-sided specifications are mainly used. As to a disc capacity, a single-sided single-layer disc has a capacity of 4.7 GB, and a single-sided dual-layer disc has a capacity of 4.27 GB on each layer (8.54 GB per disc).

=Single-Sided Single-Layer DVD=

FIG. 1 shows a relationship between a basic structure of a single-sided single-layer DVD disc 10 and an optical head. As is well known, the DVD disc 10 has a structure in which two disc substrates, each having a thickness of 0.6 mm, are attached to each other. One of the substrates is a signal substrate 11, and the other is a dummy substrate 14. The two substrates are attached to each other by means of an adhesion layer 24 so as to dispose a recording layer 20 therebetween. Normally, these substrates are made of a plastic material called polycarbonate by use of an injection molding machine.

Note that image information, data information and the like are recorded on a spiral track in the form of an embossed pit in the signal substrate 11. A red laser 30 (wavelength: 650 nm) which reads information on the recording layer is condensed by an objective lens 35 (NA: 0.6) and focused onto the recording layer 20 through an optically transparent layer 13 in the signal substrate 11.

Each of FIGS. 2A and 2B shows a position of the recording layer viewed from an incident surface 12 of the single-sided single-layer disc. FIG. 2A shows the case of Normal single layer, which is conventionally used, where the center value of the thickness of the optically transparent layer 13 is 600 µm, and the recording layer is disposed at a distance in a range from 570 µm to 630 µm inclusive from the incident surface. This value is set in consideration of a spherical aberration of the objective lens 35. Among the cases of single-sided single layer disc, a case with Thin single layer has been recently added as a DVD standard (see www.dvdforum.org or DVD Book), if the case, as shown in FIG. 2B, complies with that the center value of the thickness of the optically transparent layer 13 is at 565 µm and that the recording layer is disposed at a distance in a range from 550 µm to 580 µm inclusive from the incident surface.

=Single-Sided Dual-Layer DVD=

FIG. 3 shows a relationship between a basic configuration of a single-sided dual-layer disc 15 and an optical head. As is well known, this disc includes a first recording layer 21 and a second recording layer 23. These two recording layers are accessed from one side of the disc, and a signal can be reproduced. As shown in FIG. 3, when viewed from a light incident surface 17, on the other side of an optically transparent layer 18, the first recording layer 21 is located nearer, and the second recording layer 23 is located farther. Accesses to the respective recording layers are realized by causing a lens actuator to move an objective lens 35 so that the objective lens 35 can make an interlayer jump.

Manufacture of the dual-layer disc described above has a main feature that the disc can be manufactured in almost the same manner as the single-sided single-layer disc. First, by use of an injection molding machine, a signal substrate 16 on which the first recording layer 21 is formed, and a signal substrate 19 on which the second recording layer 23 is formed are separately prepared. Next, a semitransparent film is attached to the first recording layer 21, and a highly reflective film is attached to the second recording layer 23. Thereafter, the both substrates are attached to each other by means of an intermediate layer 25 in a manner that the recording layers face inside. Thus, the single-sided dual-layer disc is completed.

FIG. 4 shows positions of the recording layers viewed from the incident surface 17 of the single-sided dual-layer disc. In consideration of a spherical aberration of the objective lens and a crosstalk between the recording layers, the position of the first recording layer 21 is limited in a manner that its distance from the incident surface is 550 µm at the smallest, and the position of the second recording layer 23 is limited in a manner that its distance from the incident surface is 640 µm at the largest. In addition, a distance between the two layers (a thickness of the intermediate layer 25) is limited as to be 55 µm±15 µm (from 40 µm to 70 µm inclusive). The thickness of this intermediate layer 25 is usually that of an adhesion layer formed when the two substrates are attached to each other. In actual manufacturing, the thickness of the intermediate layer 25 is determined in consideration of an attachment accuracy and a molding accuracy of the signal substrate 16.

=Reflectivity of Recording Layer and so Forth=

Meanwhile, reflectivities of the recording layers are determined as follows.

Single-Layer Disc: 45 to 85% (PBS present) or 60 to 85% (PBS not present), circularly polarized light, and Dual-Layer Disc: 18 to 30% (PBS present) or 18 to 30% (PBS not present), circularly polarized light Moreover, information indicating a reflectivity of a disc is located at b29 among 4-byte ID (identification data) in a data frame. Here, 0b: the case where the reflectivity is greater than 40% (PBS present), and 1b: the case where the reflectivity is less than or equal to 40% (PBS present)

Other than the above, the ID includes the following.

| Area type: b27-b26 | |
| --- | --- |
| 00b | In the Data area |
| 01b | In the Lead-in area |
| 10b | In the Lead-out area |
| 11b | In the Middle area |
| Data type: b25 | |
| 0b | Read-only data |
| 1b | Other than read-only data |
| Layer number: b24 | |
| 0b | Layer0 of DL discs or on SL discs |
| 1b | Layer1 of DL discs |

Moreover, as to information indicating whether the disc includes one layer or two layers, Disc structure is defined by (BP2) in a control data zone, and b6-b5 shows the number of recording layers.

| 00b | Single |
| --- | --- |
| 01b | Dual |
| Others: | reserved |

Furthermore, a capacity per one layer differs between a single-layer disc and a dual-layer disc. This is because of a difference in a linear recording density. The recording density is defined in (BP3), and b7-b4 shows the linear recording density as follows.

| 0000b: | 0.267 µm (linear recording density of a single-layer disc) |
| --- | --- |
| 0001b: | 0.293 µm (linear recording density of a dual-layer disc) |

=Next-Generation DVD=

Meanwhile, as has been recently well publicized, there has been proposed a HD DVD whose density is increased to at least 3 times as high as a DVD by use of a blue-violet semiconductor laser (hereinafter referred to as a blue-violet laser) in order to satisfy a desire to store HD (high-definition) images in one disc. Moreover, standardization of the HD DVD has been underway in the DVD forum (See www.dvd-forum.org. The HD DVD has not yet been commercialized.)

The HD DVD has the same disc structure as that of the conventional DVD. As to a capacity thereof, a single-sided single-layer disc has a capacity of 15 GB, and a double-sided dual-layer disc has a capacity of 30 GB. These large capacities are realized by new technologies such as shortening of a wavelength of a laser beam, increasing of a NA, an improved modulation method, and a new signal processing (PRML: partial response and most likelihood).

FIG. 5 shows a relationship between a basic structure of a single-sided dual-layer HD DVD disc 40 and an optical head. The HD DVD has a different spherical aberration, a different coma aberration by a tilt, and the like. This is because a laser beam 60 which reads information from the disc is shortened from a red laser beam (650 nm) to a blue-violet laser beam (405 nm), and a NA of an objective lens 65 is increased from 0.6 to 0.65. Thus, an actual HD DVD disc is slightly different from a DVD in positions of first and second recording layers 51 and 53, a thickness of an intermediate layer 55, and the like.

FIG. 6 shows the positions of the recording layers of the single-sided dual-layer HD DVD disc when viewed from an incident surface 46. Along with the shortened wavelength and the increased NA, the spherical aberration becomes severer. Thus, the position of the first recording layer 51 is limited within a range from 578 µm to 622 µm inclusive. A distance between the two layers (a thickness of the intermediate layer 55) is set to 20 µm±5 µm (15 µm to 25 µm).

=Existing DVD and Next-Generation DVD=

As described above, there has been proposed a high-capacity HD DVD capable of storing HD images. An HD DVD device (drive or player) which is newly designed for the HD DVD can be designed to read not only HD DVD discs but also DVDs. However, a recording density, a modulation method, signal processing, a track format, and the like of the HD DVD are for the most part different from those of the DVD. Thus, the HD DVD cannot be read by use of a conventional DVD device (drive or player). Specifically, the conventional DVD device has a problem that not only HD movie contents recorded on the HD DVD disc but also conventional DVD movie contents cannot be read. Accordingly, the problem has become a factor that inhibits dissemination of the HD DVD.

SUMMARY OF THE INVENTION

In consideration of the problem as described above, it is an object of the present invention to enable one disc to process HD DVD information as well as DVD information.

An optical disc according to one aspect of the present invention comprises an optically transparent layer; a first recording layer accessed by a first laser beam; an intermediate layer; and a second recording layer accessed by a second laser beam, wherein the optically transparent layer, the first recording layer, the intermediate layer, and the second recording layer are sequentially disposed in a laser beam incidence direction, wherein a thickness of the optically transparent layer, which is a distance from a light incident surface to the first recording layer, is 550 to 575 µm, wherein a thickness of the intermediate layer, which is a distance between the first and second recording layers, is 29 to 47 µm, and wherein a surface recording density of the second recording layer is at least 3 times that of the first recording layer.

An optical disc device according to one aspect of the present invention which reads information recorded on an optical disc, comprises an optical head configured to generate a first laser beam and a second laser beam; and a controller configured to cause the optical head to selectively generate any of the first laser beam and the second laser beam, wherein the optical disc has an optically transparent layer, a first recording layer accessed by the first laser beam, an intermediate layer, and a second recording layer accessed by the second laser beam, wherein the optically transparent layer, the first recording layer, the intermediate layer, and the second recording layer are sequentially disposed in a laser beam incidence direction, wherein a thickness of the optically transparent layer that is a distance from a light incident surface to the first recording layer is 550 to 575 µm, wherein a thickness of the intermediate layer that is a distance between the first and second recording layers is 29 to 47 µm, and wherein a surface recording density of the second recording layer is at least 3 times that of the first recording layer.

According to the present invention, it is possible to provide an optical disc in which a first recording layer (equivalent to a DVD layer) can be accessed by a first laser beam (a red laser), and a second recording layer (equivalent to an HD DVD layer) can be accessed by a second laser beam (a blue-violet laser) from one side of the disc. Therefore, both of DVD movie contents and HD DVD movie contents can be stored in one disc. Specifically, the disc becomes a combination disc which can process both of SD images and HD images.

Thus, a conventional DVD compatible optical disc device reproduces DVD contents. A new HD DVD compatible optical disc device can reproduce HD DVD movie contents or both of HD DVD and DVD movie contents.

For example, if the same movie contents were prepared as DVD contents and HD DVD contents, both of which are stored in one disc, a user who has only a DVD compatible device can view the DVD movie contents. Meanwhile, a user who has the HD DVD compatible device can view the HD DVD movie contents.

Even a user who does not currently have the HD DVD compatible device can enjoy HD images with a disc he/she has already bought, without newly buying a HD DVD disc, if he/she buys the HD DVD compatible device in the future. Thus, the present invention contributes to a great advantage for the user.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification of the accompanying drawings.

=Basic Configuration of Optical Disc=

Figure 7:
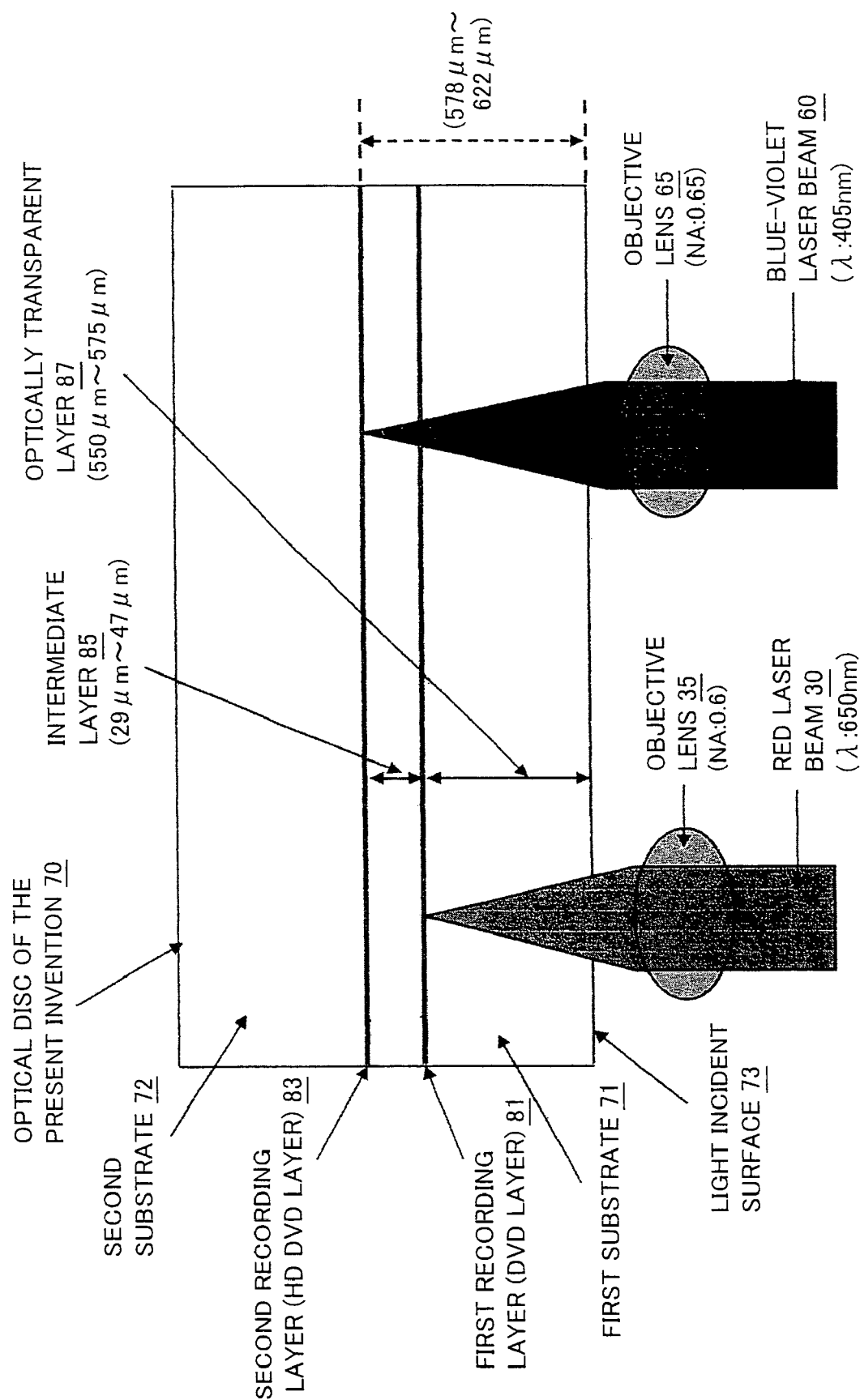
FIG. 7 shows a relationship between an optical disc according to an embodiment of the present invention and a reproduction optical system.

FIG. 7 shows a relationship between an optical disc 70 according to one embodiment of the present invention and an optical head. The optical disc 70 is formed of a first substrate 71 and a second substrate 72. A first recording layer (equivalent to a DVD layer) 81 made of a semitransparent film is formed on a side closer to an incident surface 73 of a laser beam, and a second recording layer (equivalent to an HD DVD layer) 83 made of a highly reflective film is formed on the other side farther away from the incident surface 73.

Figure 1:
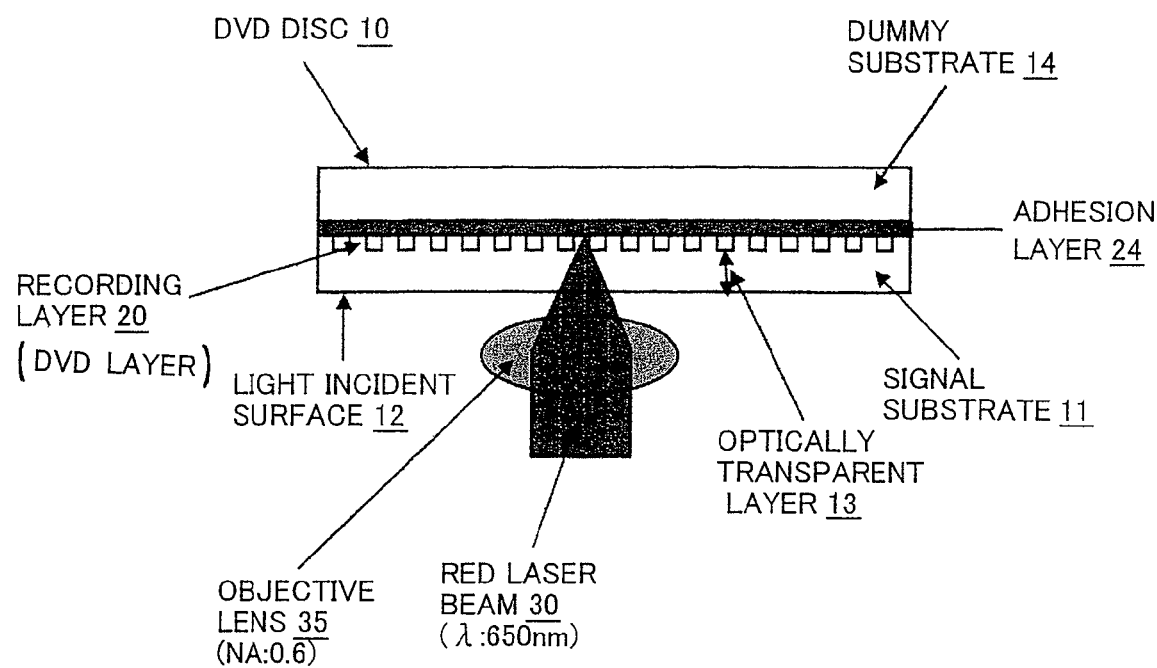
FIG. 1 shows a relationship between a basic structure of a single-sided single-layer DVD disc and an optical head.
Figure 2:
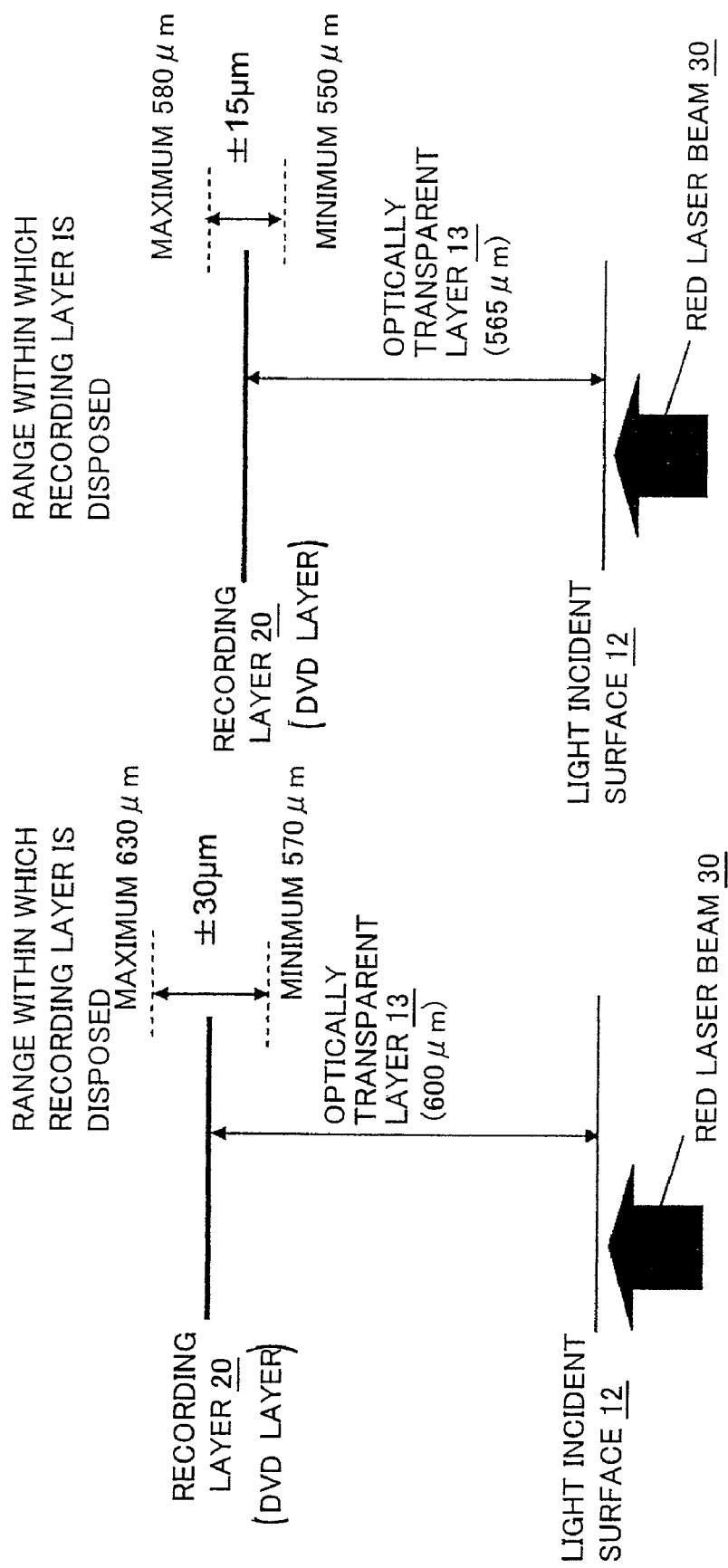
FIG. 2A shows a position of a recording layer in the single-sided single-layer DVD disc in a case of Normal single layer.
FIG. 2B shows a position of a recording layer in the single-sided single-layer DVD disc in a case of Thin single layer.
Figure 3:
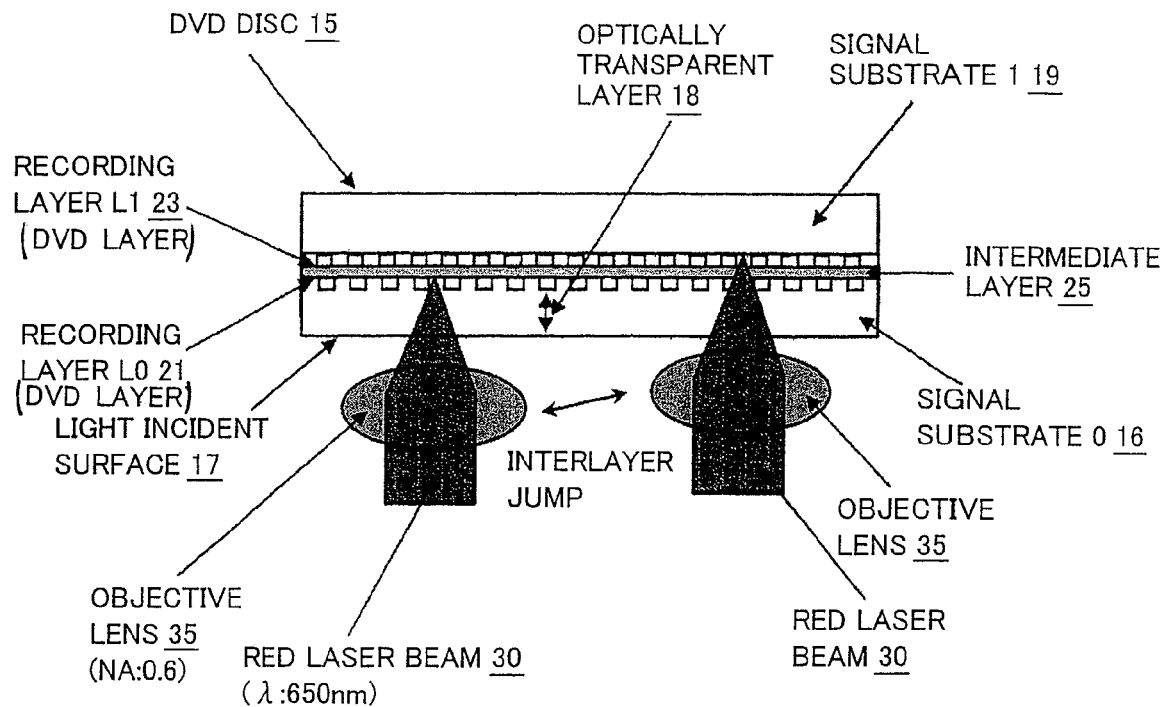
FIG. 3 shows a relationship between a basic structure of a single-sided dual-layer DVD disc and an optical head.
Figure 8:
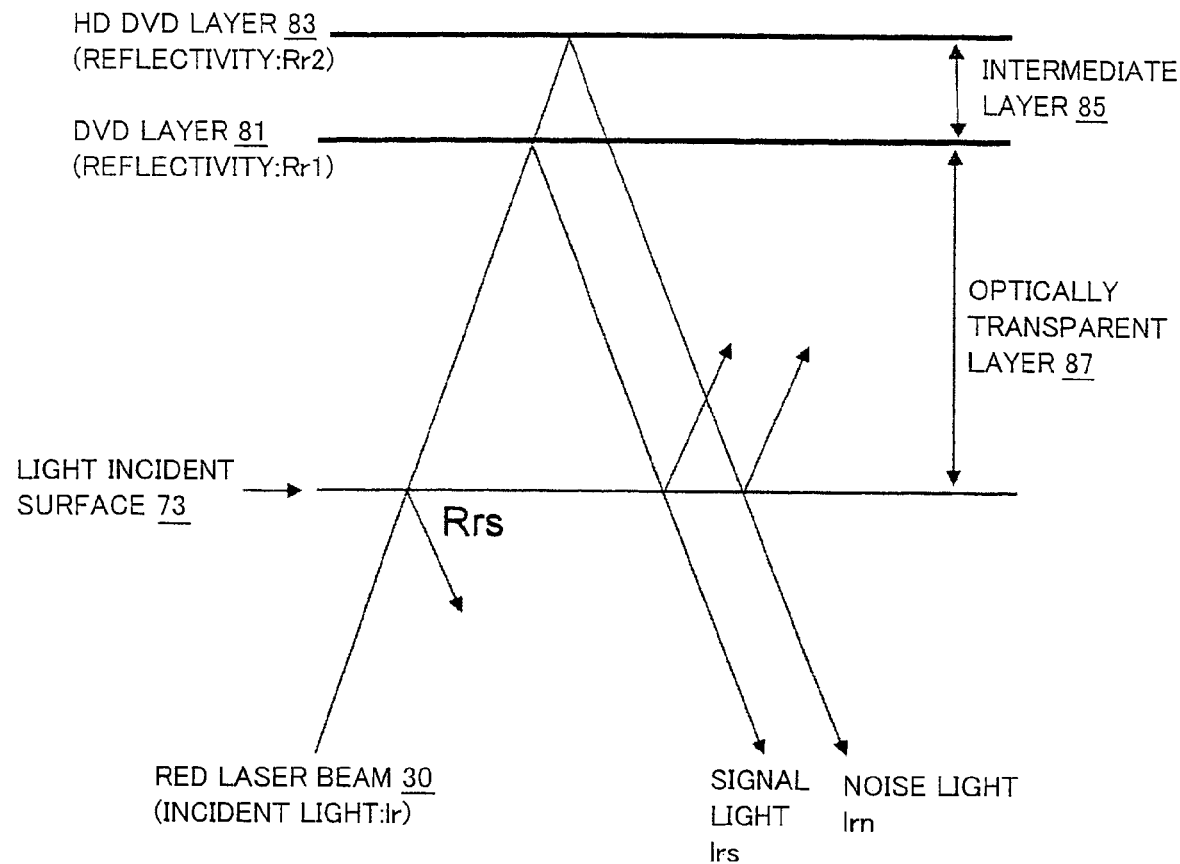
FIG. 8 shows a relationship between the optical disc according to an embodiment of the present invention and a red laser beam.
Figure 9:
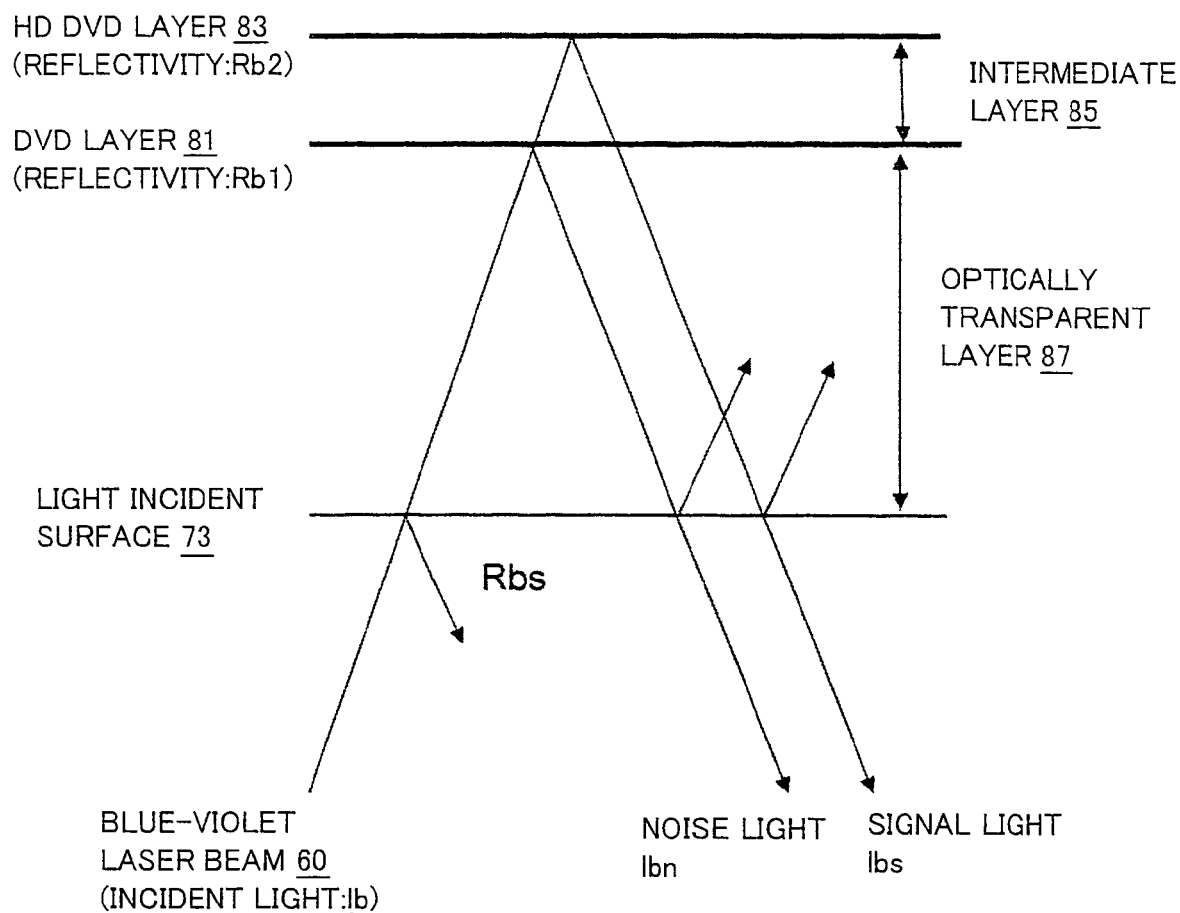
FIG. 9 shows a relationship between the optical disc according to an embodiment of the present invention and a blue-violet laser beam.

FIG. 8 shows a state where the first recording layer (DVD layer) 81 is reproduced by use of a red laser beam 30. FIG. 9 shows a state where the second recording layer (HD DVD layer) 83 is reproduced by use of a blue-violet laser beam 65. First, in order to enable the HD DVD layer 83 to be reproduced by use of the blue-violet laser beam, with reference to FIG. 6, the HD DVD layer 83 has to be positioned within a range from 578 μm and 622 μm inclusive from the incident surface (a spherical aberration limit). Moreover, in the case of Thin single layer shown in FIG. 2B, the DVD layer 81 has to be positioned within a range from 550 μm to 580 μm inclusive from the incident surface (the minimum of 550 μm is a spherical aberration limit). Meanwhile, a thickness of an intermediate layer 85 is determined in consideration of a crosstalk caused between the DVD layer 81 and the HD DVD layer 83. The thickness thereof is not less than 15 μm in the case of a HD DVD, and is 40 μm in the case of a DVD. However, in either case, the thickness thereof depends on an optical system.

The first substrate 71 has the DVD layer 81 formed therein, and transmits the blue-violet laser beam which reproduces the HD DVD layer 83. Accordingly, in consideration of a molding accuracy of this substrate, a thickness of an optically transparent layer 87 is set at a range from 550 μm to 575 μm inclusive. Specifically, the DVD layer 81 is positioned within a range from 550 μm to 575 μm from the incident surface 73. The molding accuracy of ±12.5 μm is severer than ±15 μm in the case of Thin single layer, but is eased compared to ±9.5 μm in the case of the HD DVD (in the case where a maximum value of the intermediate layer is 25 μm).

Considering that the HD DVD layer 83 has to be positioned within a range from 578 μm to 622 μm inclusive from the incident surface, the thickness of the intermediate layer 85 is within a range from a minimum value: 578 μm−550 μm=28 μm to a maximum value: 622 μm−575 μm=47 μm. The maximum value of the intermediate layer 85 is increased as the molding accuracy of the DVD signal substrate 71 is increased. On the other hand, the maximum value thereof is reduced if the molding accuracy is lowered.

=Reflectivity and so Forth=

Next, in a conventional DVD device which has been already mass-marketed, in order for the optical disc described above to be recognized as a single-sided thin single layer disc, as shown in FIG. 8, signal light Irs from the DVD layer 81 has to be greater than or equal to 45% of the red laser beam 30. Meanwhile, in the case where a blue-violet laser beam 60 is irradiated onto the same optical disc, as shown in FIG. 9, signal light Ibs from the HD DVD layer 83 has to be focused and subjected to tracking servo by this light, and has to be able to reproduce a signal.

A reflectivity of the HD DVD standard with respect to the blue-violet laser beam is specified as follows.

In the case of HD DVD-ROM,
Single-Sided Single-Layer Disc:
40% to 70% (including birefringence)
Single-Sided Dual-Layer Disc:
18% to 32% (including birefringence)
In the case of HD DVD Rewritable (at System lead in area),
Single-Sided Single-Layer Disc:
4% to 8% (including birefringence)

In the case of the optical disc of the present invention, the HD DVD layer is disposed in the same position as that of the single-sided dual-layer HD DVD-ROM disc. Thus, it is preferable that the reflectivity is within this specified range. However, as to the HD DVD layer of this optical disc, since the HD DVD has not yet been commercialized, a new regulation can be included in the HD DVD standards. In such a case, a lower limit of the reflectivity needs to be larger than that of the Rewritable disc.

Figure 4:
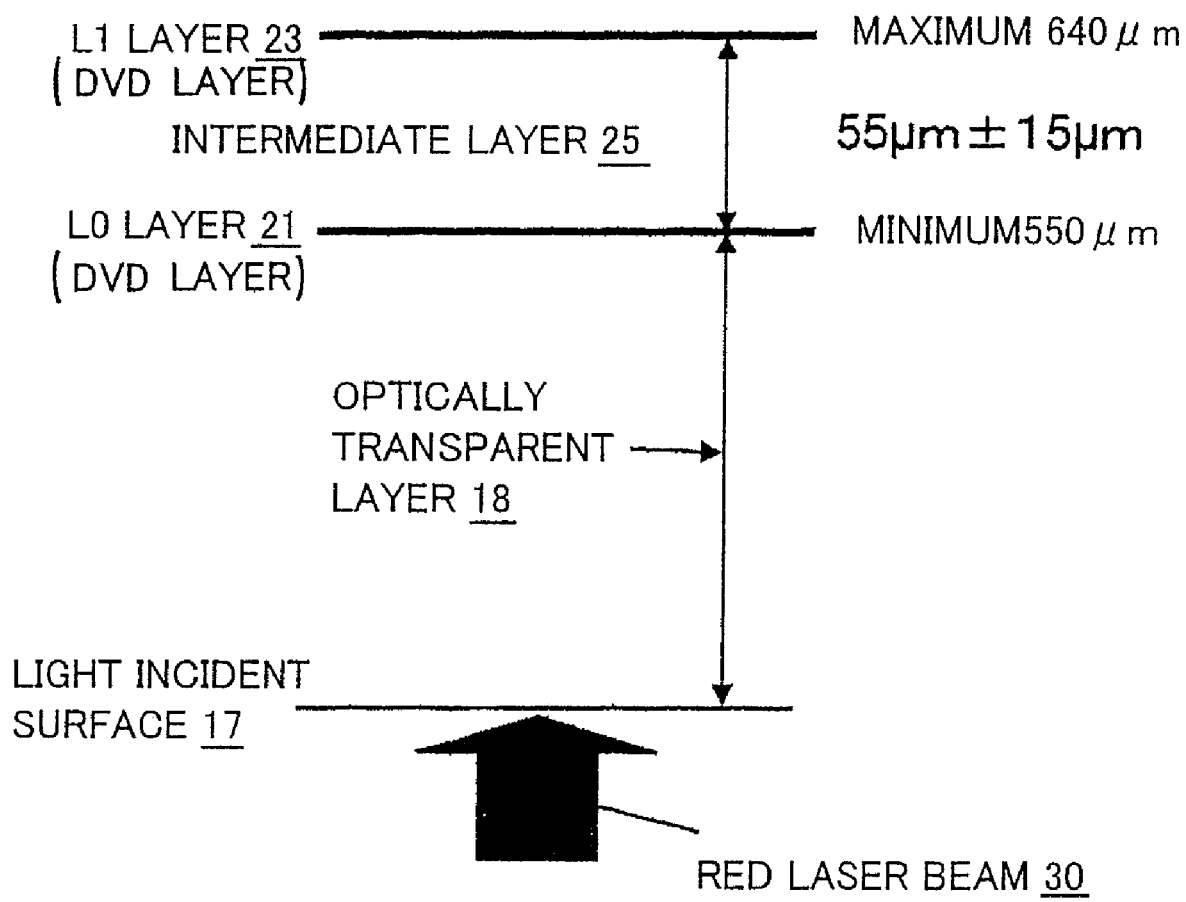
FIG. 4 shows positions of recording layers in the single-sided dual-layer DVD disc.
Figure 5:
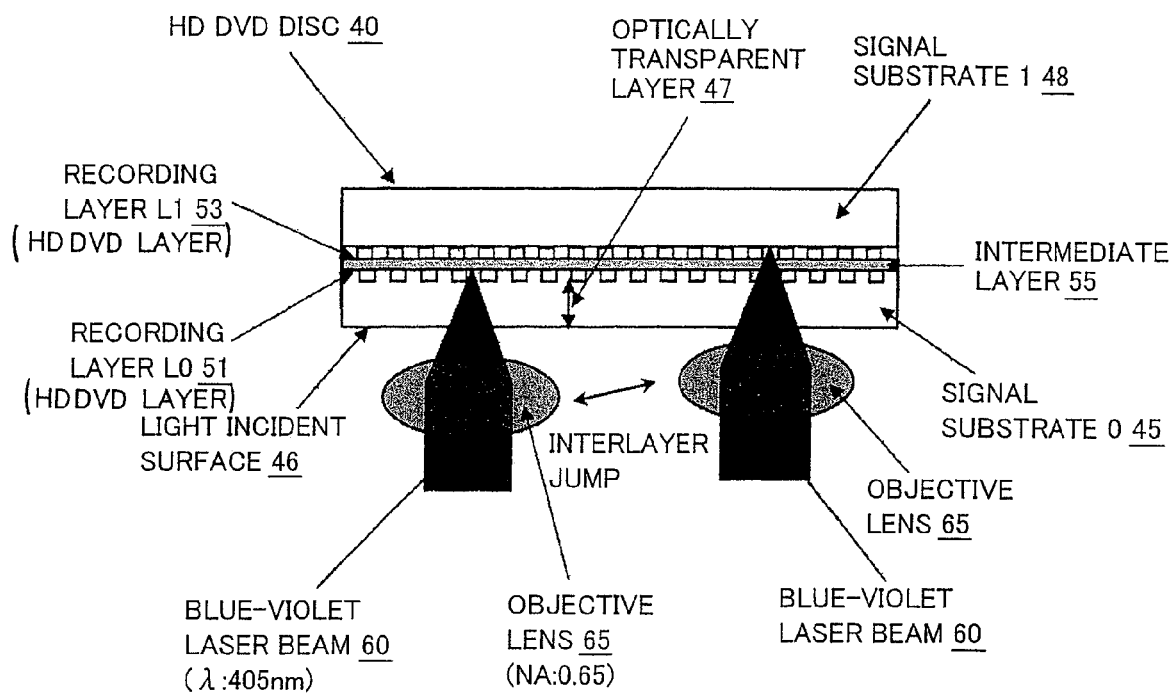
FIG. 5 shows a relationship between a basic structure of a single-sided dual-layer HD DVD disc and an optical head.

In the case of the single-sided dual-layer DVD disc shown in FIG. 4, reproduction light is the red laser beam 30. Thus, usually, Au, Si or the like is used as the semitransparent film of the first recording layer 21, and inexpensive Al alloy is used for the second recording layer 23 which is the highly reflective film.

Figure 6:
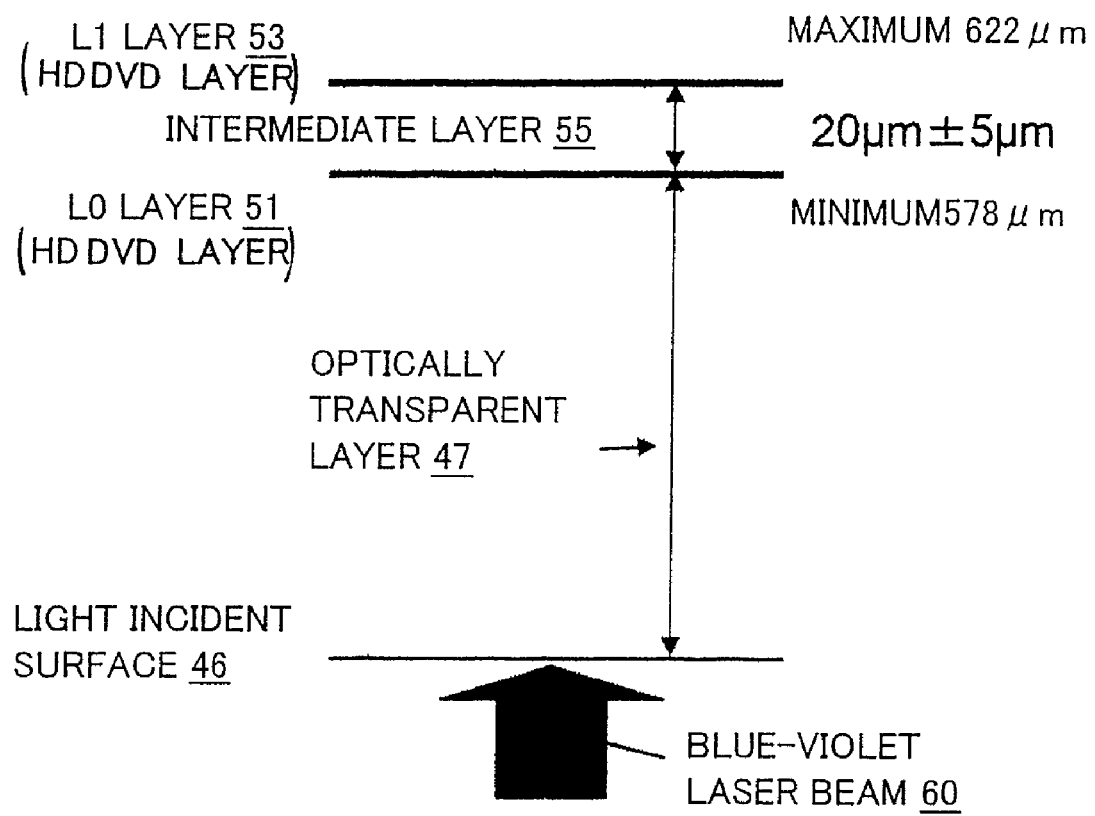
FIG. 6 shows positions of recording layers in the single-sided dual-layer HD DVD disc.

However, in the case of the HD DVD shown in FIG. 6, if Au or Si is used, it is difficult to form a semitransparent layer within a proper range for the blue-violet laser beam. Thus, recently, the semitransparent film of the first recording layer 51 is made of Ag alloy, and Ag alloy, Al alloy or the like is used for the highly reflective film of the second recording layer 53.

A description will be given below with regard to a case where the DVD layer (the semitransparent film) 51 of the optical disc 70 is formed of Ag alloy, and the HD DVD layer (the highly reflective film) 53 thereof is formed of Al alloy.

FIG. 8 shows a state where the red laser beam 30 is made incident onto the optical disc 70. A reflectivity (Rrs) on the incident surface is set at 4.8% (no antireflection) based on a refractive index of the first substrate 71 with respect to the red laser beam 30. The optically transparent layer 87 is also used as an optically transparent layer for the HD DVD layer. Thus, if a birefringence is a double pass of 60 nm, a reduction in amplitude by the birefringence is up to 8.2%. Therefore, in order for the signal light Irs from the DVD layer 81 to be greater than or equal to 45% of the incident light Ir, a reflectivity Rr1 of the DVD layer is 54% (=45%/($0.952^2 \times 0.918$)).

Next, a transmittance of the semitransparent DVD layer 51 with respect to the red laser beam 30 is 46% (when Rr1 is 54%), and a reflectivity of the HD DVD layer 53 of the highly reflective film, which is formed of Al alloy, is 85%. Thus, noise light Irn from the HD DVD layer 53 is 15% (=$0.952^2 \times 0.918 \times 0.46^2 \times 0.85 \times 100\%$) of the incident light Ir. This value is approximately half that of the single-sided dual-layer DVD disc shown in FIG. 4.

Next, FIG. 9 shows a state where the blue-violet laser beam 65 is made incident onto the optical disc 70. A reflectivity (Rbs) of the blue-violet laser beam 65 on the incident surface is 5.6%, a reduction in amplitude of the optically transparent layer 87 by birefringence is up to 20% (60 nm in a double pass), and a reflectivity Rb1 of the semitransparent DVD layer is 48.2%. Thus, a transmittance of the DVD layer is 38.6%. If a reflectivity Rb2 of the HD DVD layer formed of the highly reflective film is 88%, signal light Ibs is 9.2% (=$0.944^2 \times 0.8 \times 0.386^2 \times 0.87 \times 100\%$) of the incident light Ib. Moreover, noise light Ibn from the DVD layer is 34.4% (=$0.944^2 \times 0.8 \times 0.482 \times 100\%$) of the incident light Ib.

If the birefringence is suppressed to 40 nm which is the same as that of the Rewritable disc, a reduction in the amplitude by the birefringence is 9.3%, and the calculated value described above may be multiplied by 1.13. Accordingly, the signal light Ibs is set at 10.4%, and the noise light Ibn is set at 38.9%.

=Interlayer Crosstalk and Intermediate Layer=

Next, an interlayer crosstalk and a thickness of an intermediate layer will be considered. In FIG. 8, when the DVD layer 81 is reproduced by use of the red laser beam, light transmitted through this layer is reflected on the HD DVD layer 83 thereabove, and is transmitted again through the DVD layer 81. A reproduction optical system has a role of imaging the DVD layer 81 on a surface of a photodetector. Thus, the noise light Irn reflected on the HD DVD layer 83 contributes to the photodetector by the square of the thickness of the intermediate layer.

In the single-sided dual-layer DVD disc shown in FIG. 4, the minimum thickness value of the intermediate layer is set at 40 μm. With this value, the interlayer crosstalk is set at a level which causes no problem. In addition, the reflectivity of the first recording layer 21 is determined so as to set light reflected from the two layers to be approximately equal.

As shown in FIG. 8, if the DVD layer 81 is reproduced by use of the red laser beam 30, the noise light Irn from the HD DVD layer 83 is 15% of the incident light, which is ⅓ (¹⁵⁄₄₅) of 45% of the signal light Irs from the DVD layer 81 (birefringence: 60 nm). This value indicates that, even if the thickness of the intermediate layer is reduced to 23 μm (=40 μm/√3) from its minimum value 40 μm, an amount of the interlayer crosstalk is the same.

Next, as shown in FIG. 9, if the HD DVD layer 83 is reproduced by use of the blue-violet laser beam 65, the signal light Ibs is 9.2% of the incident light. Meanwhile, the noise light Ibn is 34.4% of the incident light, which is 3.74 times the signal light Ibs. According to the regulations of the HD DVD standards, the minimum thickness value of the intermediate layer is 15 μm. Thus, in order to lower the noise light to an equivalent level, the minimum value of the intermediate layer may be set to 29 μm (=15 μm×√3.74). Specifically, if the thickness of the intermediate layer is within a range from 29 μm to 47 μm, the interlayer crosstalk will cause no problem.

In an actual case, adhesion accuracy can be improved to about ±3 μm also in the HD DVD. Since the minimum value of the intermediate layer is improved to about 19 μm, it is preferable that the thickness of the intermediate layer is set at about 40±5 μm.

=Flag Information=

Next, a description will be given of setting of a flag of the optical disc according to an embodiment the present invention. The DVD layer 81 needs to be handled as a normal single-sided single-layer DVD. Accordingly, ID in Data frame and (BP2) of Physical format information in Control data zone are set as the single-sided single-layer disc.

Meanwhile, as to the HD DVD layer 83, ID in Data frame and (BP2) of Physical format information in Control data zone are set as the single-sided single-layer disc.

It is preferable that a flag indicating that the optical disc according to an embodiment of the present invention has two layers including the DVD layer and the HD DVD layer uses reserved bits in (BP2) Disc structure in Physical format information in Control data zone. There are two reserved spots, which are b7 and b3 that are not used in Layer type. These bits are reserved not only in a ROM but also in Rewritable, R, and the like. Thus, these bits are considered to have no influence.

| (BP2) Disc structure | | |
|---|---|---|
| b3 | 0b | reserved |
| | 1b | DVD layer in first layer, HD DVD layer in second layer |

=Reproduction by Optical Disc Device of DVD Standard=

Figure 10:
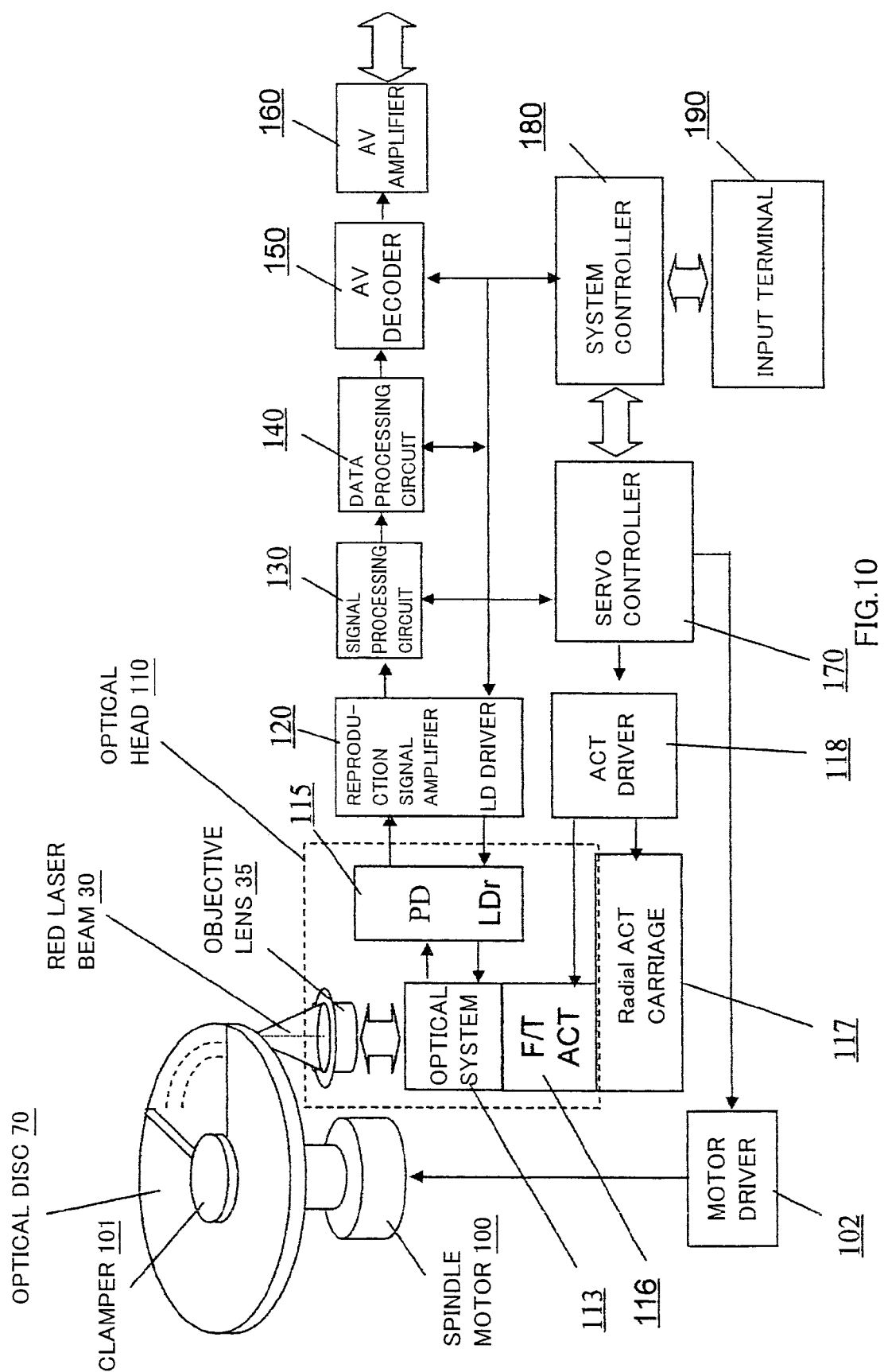
FIG. 10 is a block diagram of an optical disc device of a DVD standard.
Figure 11:
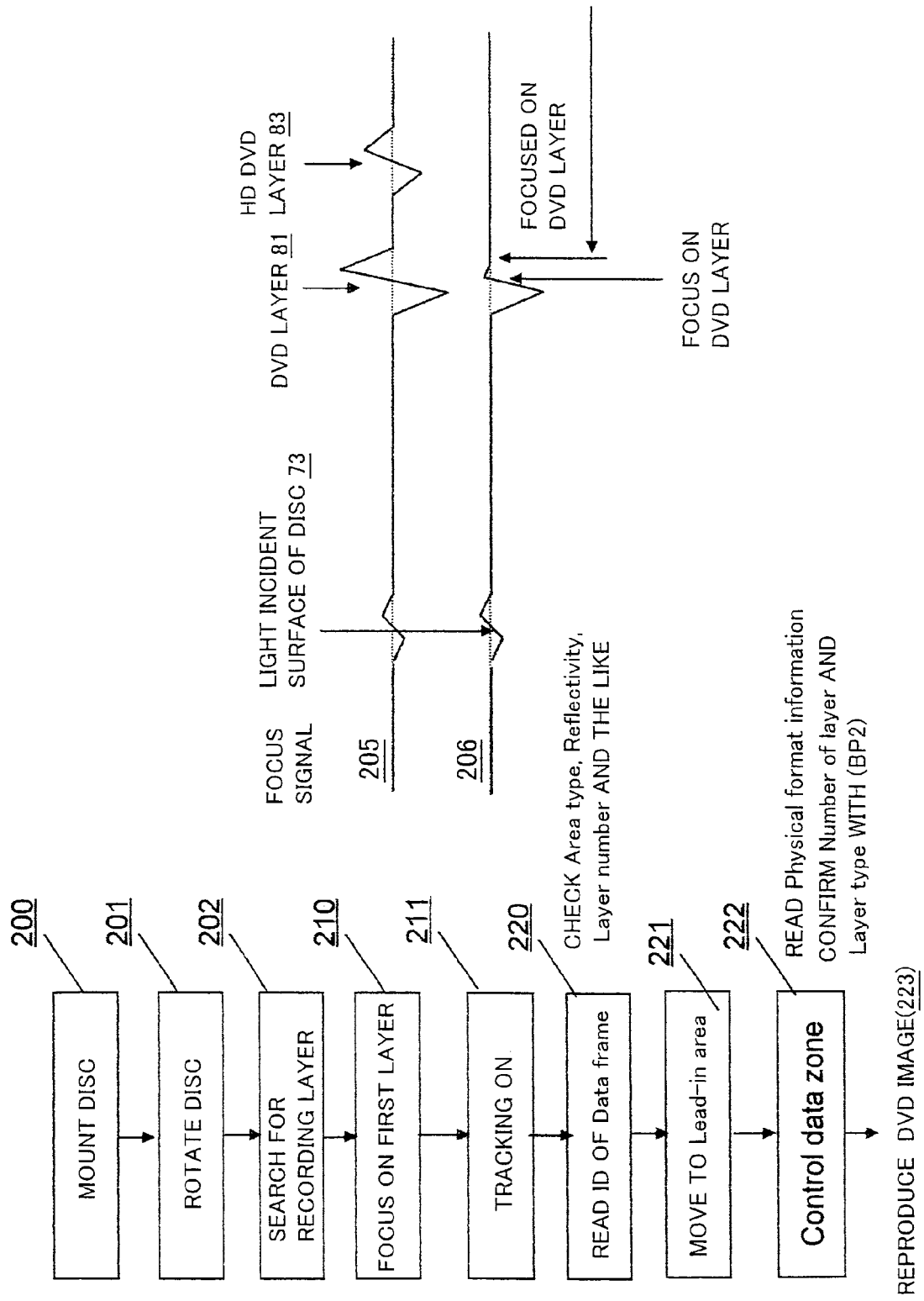
FIGS. 11A and 11B show a flow of operations performed by the optical disc device of the DVD standard.

Next, with reference to FIGS. 10, 11A and 11B, a description will be given of the case where the disc of an embodiment of the present invention is reproduced by use of a conventional DVD device. FIG. 10 shows a main configuration of a well-known conventional DVD device. FIGS. 11A and 11B show an operational flow thereof and a focus servo.

When the optical disc 70 of the present invention is mounted on the conventional DVD device, a spindle motor 100 is rotated up to predetermined revolutions. Next, a periodic drive current is allowed to flow into a focus ACT 116, and an optical head is moved up and down in an axial direction. Accordingly, a focus signal 206 produced from a reproduction signal periodically appears. A focus signal level from the DVD layer is 3 times as large as a signal level from the HD DVD layer. Thus, most DVD devices recognize this disc as a single-sided single-layer DVD disc, and turn on a focus servo to the DVD layer as indicated by reference numeral 207.

Accordingly, after a short setting time, onfocus is set (210). Subsequently, a tracking servo is turned on, and tracking is performed on an appropriate position of the disc (211). In this state, ID in Data frame is read (220), and Area type, Reflectivity, Layer number and the like of the disc are checked. Thereafter, Radial ACT 117 is driven to move the disc to Lead-in area (221). When the disc is moved to Control data zone (222), (BP2) Number of layer and Layer type in Physical format information are read, and the disc is confirmed to be the single-sided single-layer DVD disc. Thereafter, DVD images are reproduced (223).

Depending on devices, there is a case where, despite a small signal level of the HD DVD layer, the disc is determined to be a single-sided dual-layer DVD disc, and the HD DVD layer is read. However, since a predetermined signal cannot be obtained from the HD DVD layer, focusing is attempted again on the DVD layer to read the DVD layer. Thus, there arises no problem.

=Reproduction by Optical Disc Device of HD DVD Standard=

Figure 12:
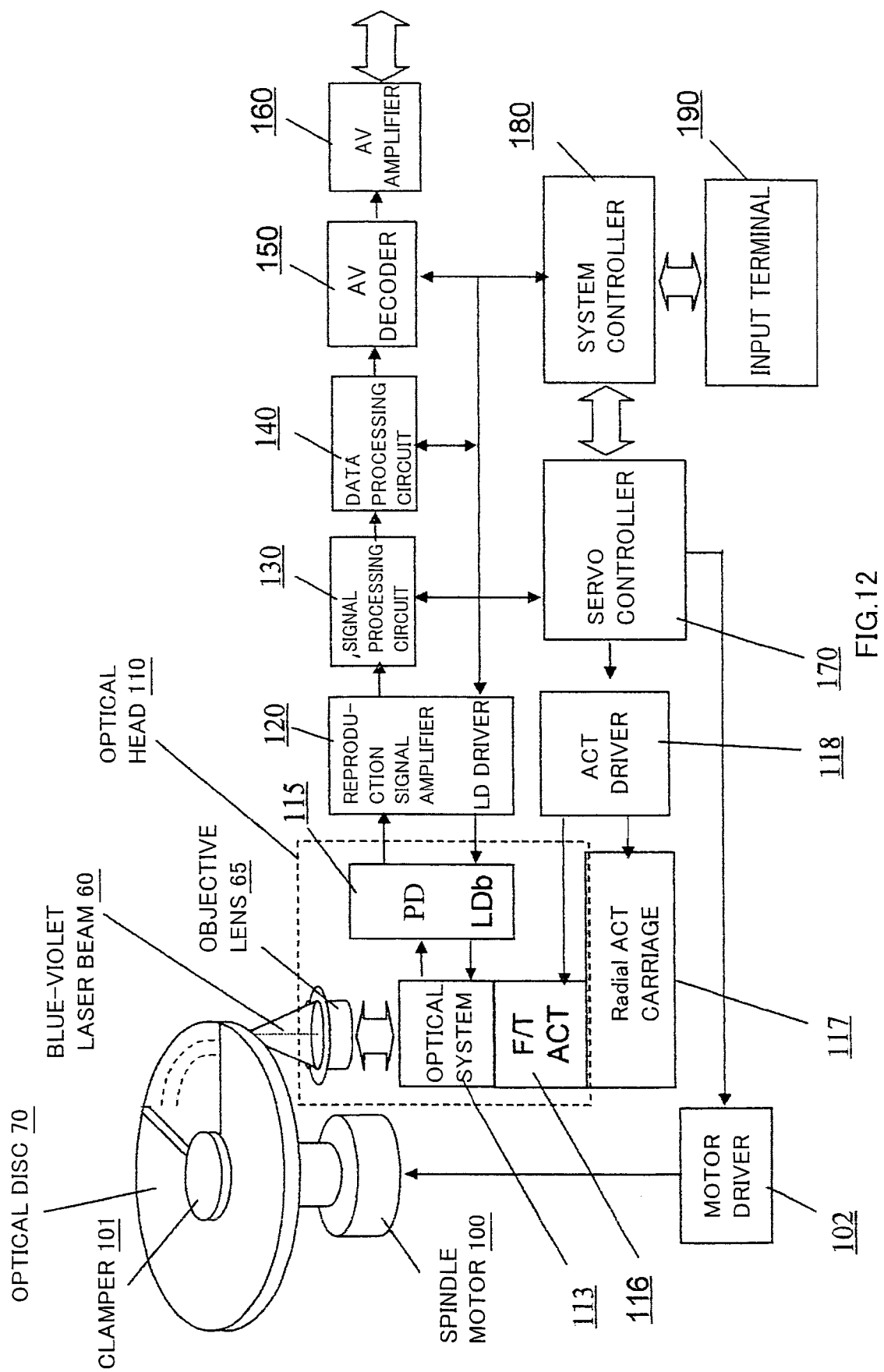
FIG. 12 is a block diagram of an optical disc device of a HD DVD standard.
Figure 13:
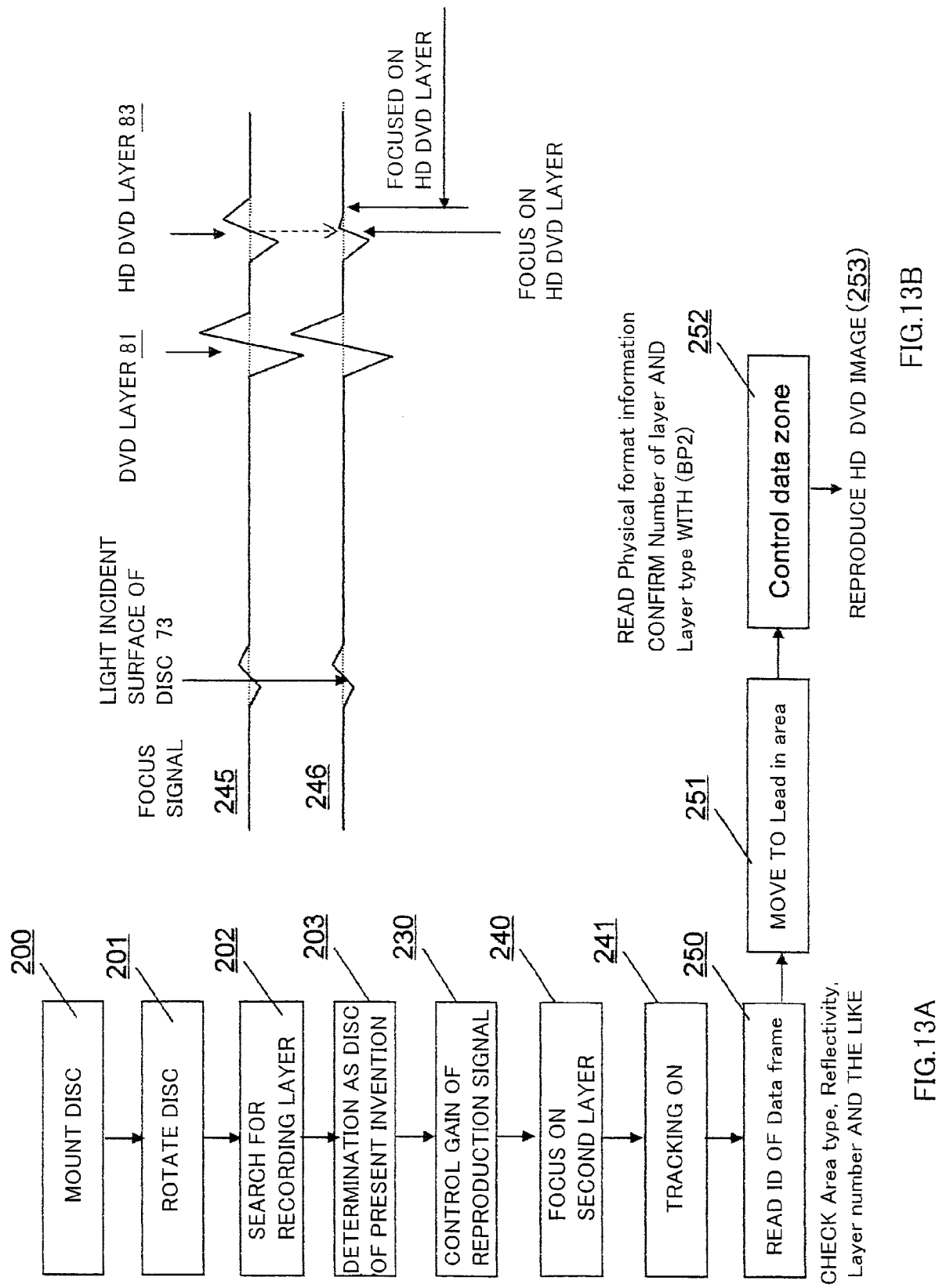
FIGS. 13A and 13B show a flow of operations performed by the optical disc device of the HD DVD standard.

Next, with reference to FIGS. 12, 13A and 13B, the case of a HD DVD device using a blue-violet laser beam will be described. First, a periodic drive current is allowed to flow into a focus ACT 116. Thereafter, it is recognized that there are two recording layers based on a focus signal, and that a disc is the disc of the present invention based on a difference in a level thereof. In this case, a gain of a reproduction signal is controlled (230), and focusing is performed on the HD DVD layer (240). After a short setting time, onfocus is set. Subsequently, when a tracking servo is turned on (241), an on-tracking state is set in an appropriate position.

Subsequently, ID in Data frame is read (250), and Area type, Reflectivity, Layer number and the like of the disc are checked. Thereafter, Radial ACT 117 is driven to move the disc to Lead-in area (251). When the disc is moved to Control data zone (252), (BP2) b3, Number of layer and Layer type in Physical format information are read, and the disc is confirmed to be the single-sided single-layer DVD disc. Thereafter, HD DVD images are reproduced (253).

=Reproduction by Optical Disc Device Compatible with Both DVD and HD DVD Standards=

Figure 14:
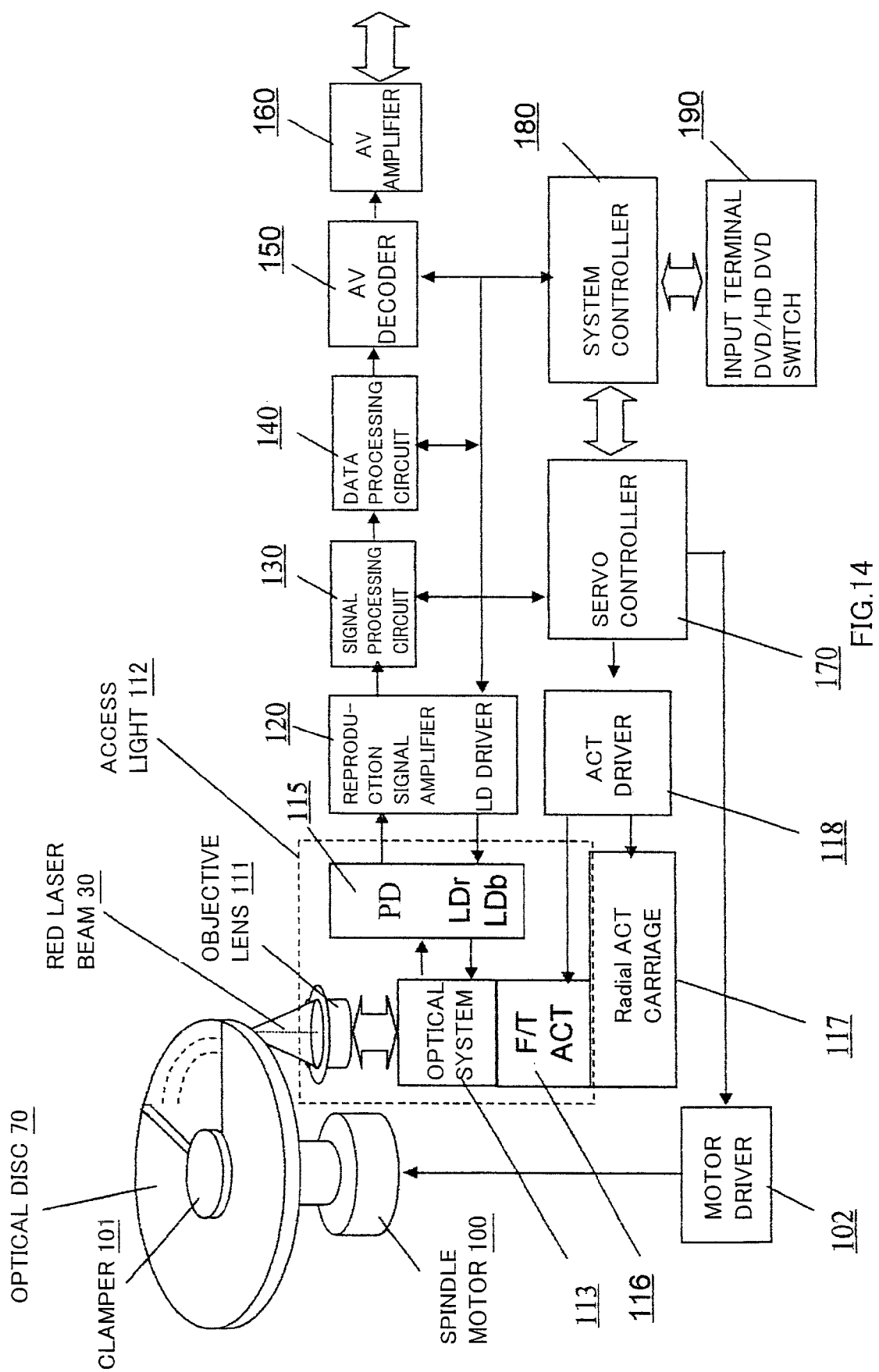
FIG. 14 is a block diagram of an optical disc device according to an embodiment of the present invention.
Figure 15:
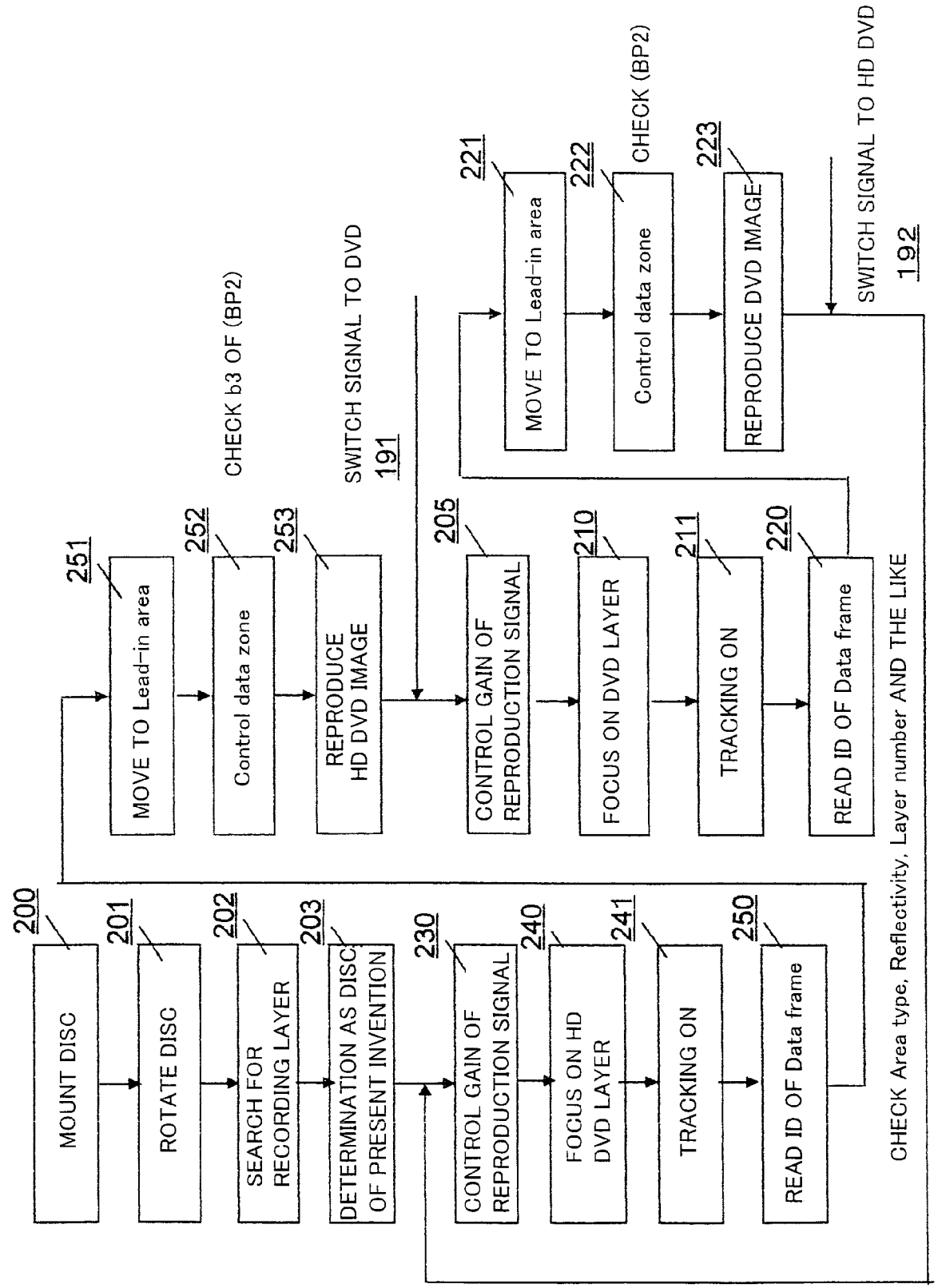
FIG. 15 shows a flow of operations performed by the optical disc device according to one embodiment of the present invention.

Next, with reference to FIGS. 14 and 15, description will be given of a compatible device according to the present invention, which uses both of a red laser beam and a blue-violet laser beam. In this compatible device, the blue-violet laser beam is first focused on a disc, and a focus ACT 116 is driven.

Thereafter, based on a focus signal, the disc is determined to be the disc of the present invention (203). Thereafter, a gain of a reproduction signal is controlled (230), and focusing is performed on the HD DVD layer (240). Subsequently, tracking is turned on (241), ID in Data frame is read (250), the disc is moved to Lead-in area (251), and Physical format information in Control data zone is read (252). Based on a b3 flag of Layer type of (BP2) Disc structure, confirmation of the disc of the present invention is performed. Subsequently, the number of layer and the layer type are checked, and a layer which is being currently accessed is recognized to be the HD DVD layer. Thus, HD DVD images are reproduced (253).

Next, when a user selects a DVD by use of an input terminal 190 (191), a gain of a reproduction signal is controlled (205), focusing is performed on the DVD layer (210), tracking is turned on (211), and ID in Data frame is checked (220). Subsequently, the disc is moved to Lead-in area (221), a flag in Control data zone is checked (222), and DVD images are reproduced. If the user selects a HD DVD (192), HD DVD images can be reproduced by use of the method described above (253).

As described above, according to the present invention, a DVD and a HD DVD can be formed in one optical disc. The DVD layer is reproduced in the existing DVD device, and the HD DVD layer is reproduced in the HD DVD device corresponding to the HD DVD standards. In the compatible device according to the present invention, both of the DVD layer and the HD DVD layer can be reproduced. While combining products of the existing DVD standards and products of new HD DVD standards, smooth dissemination of products of the HD DVD standards into general users can be facilitated.

Other Embodiments

In the foregoing embodiment, the description was given of the case where the semitransparent film of the first recording layer is formed of Ag alloy. However, if reflectivities and transmittances with respect to two laser beams having different wavelengths can be selectively set, more efficient performance can be achieved.

For example, if the first recording layer is formed of a multiple interaction film or the like, the reflectivity with respect to the first laser beam (red laser beam) can be set higher than that of the second laser beam (blue-violet laser beam), and additionally, the transmittance of the first recording layer with respect to the second laser beam can be set higher than that thereof with respect to the first laser beam.

Although the preferred embodiments of the present invention have been described in detail, it should be noted that various changes, substitutions and alternations can be made therein without departing from spirit and scope of the inventions as defined by the appended claims.

What is claimed is:

1. A single-sided dual-layer optical disc comprising:
an optically transparent layer;

a first recording layer accessed by a red laser beam having a center wave length of 650 nm;
an intermediate layer; and
a second recording layer accessed by a blue-violet laser beam having a center wave length of 405 nm,
wherein the optically transparent layer, the first recording layer, the intermediate layer, and the second recording layer are sequentially disposed in a laser beam incidence direction,
wherein a thickness of the optically transparent layer, which is a distance from a light incident surface to the first recording layer, is 550 to 575 μm,
wherein a thickness of the intermediate layer, which is a distance between the first and second recording layers, is 29 to 47 μm,
wherein a surface recording density of the second recording layer is at least 3 times that of the first recording layer,
wherein a reflectivity of the first recording layer with respect to the red laser beam incident on the optical disc is greater than or equal to 45%, and wherein a reflectivity of the second recording layer with respect to the blue-violet laser beam incident on the optical disc is greater than or equal to 8%,
wherein the reflectivity of the first recording layer with respect to the red laser beam is larger than the reflectivity of the second recording layer with respect to the blue-violet laser beam, and
wherein a transmittance of the first recording layer with respect to the blue-violet laser beam is larger than a transmittance of the first recording layer with respect to the red laser beam.

* * * * *